(12) United States Patent
Kreiner et al.

(10) Patent No.: US 6,381,949 B1
(45) Date of Patent: May 7, 2002

(54) ROCKET ENGINE HAVING A TRANSITION ATTACHMENT BETWEEN A COMBUSTION CHAMBER AND AN INJECTOR

(76) Inventors: Kurt B. Kreiner, 30311 Via Victoria, Rancho Palos Verdes, CA (US) 90275; David Bronson, 1112 Oxford Rd., San Marino, CA (US) 91108; Carl R. Stechman, 10623 Garden Grove Ave., Northridge, CA (US) 91326; Peter W. Woll, 23611 Canerwell St., Santa Clarita, CA (US) 91321; Joel M. Neiderman, 29709 Quail Run Dr., Agoura Hills, CA (US) 91301

( * ) Notice: Subject to any disclaimer, the term of this patent is extended or adjusted under 35 U.S.C. 154(b) by 0 days.

(21) Appl. No.: 09/144,375

(22) Filed: Aug. 31, 1998

(Under 37 CFR 1.47)

Related U.S. Application Data

(60) Provisional application No. 60/057,594, filed on Aug. 29, 1997.

(51) Int. Cl.[7] ............................................... F02K 9/42
(52) U.S. Cl. ....................... 60/258; 29/890.01
(58) Field of Search ................. 60/257, 258, 39.31; 29/890.01

(56) References Cited

U.S. PATENT DOCUMENTS

| | | | |
|---|---|---|---|
| 3,903,693 A | * | 9/1975 | Fox ........................... 60/200 R |
| 4,785,748 A | | 11/1988 | Sujata et al. |
| 4,882,904 A | | 11/1989 | Schoenman |
| 4,915,938 A | | 4/1990 | Sujata et al. |
| 4,936,091 A | | 6/1990 | Schoenman |
| 6,138,450 A | * | 10/2000 | Kreiner ........................ 60/257 |
| 6,138,451 A | * | 10/2000 | Kreiner ........................ 60/258 |
| 6,249,967 B1 | * | 6/2001 | Kreiner .................... 29/890.01 |
| 6,269,630 B1 | * | 8/2001 | Kreiner ........................ 60/258 |

OTHER PUBLICATIONS

Jassowski, Donald M. et al., "Advanced Small Rocket Chambers Option 1–14 Lbf Ir–Re Rocket", NASA Contract 191014, Aug. 1992.

* cited by examiner

*Primary Examiner*—Charles G. Freay
*Assistant Examiner*—Ehud Gartenberg

(57) ABSTRACT

A rocket engine has a combustion chamber, an injector, and an attachment between the combustion chamber and the injector. The attachment includes an annular metallic deposit joined to the chamber wall outer surface, and an annular transition ring structure. The transition ring structure has an annular step collar, and an annular adaptor ring brazed to the annular step collar. The adaptor ring is welded on one end to the injector and on the other end to the metallic deposit.

14 Claims, 2 Drawing Sheets

ROCKET ENGINE HAVING A TRANSITION ATTACHMENT BETWEEN A COMBUSTION CHAMBER AND AN INJECTOR

This application claims the benefit of U.S. Provisional Application No. 60/057,594, filed Aug. 29, 1997, the disclosure of which is hereby incorporated herein by reference.

This patent application is a regular application of provisional patent application Ser. No. 60/057,594, filed Aug. 29, 1997.

BACKGROUND OF THE INVENTION

This invention relates to the structure of a liquid-fueled rocket engine, and, more particularly, to the joining of the propellant injector and the combustion chamber.

A typical liquid-fueled rocket engine includes a generally cylindrical combustion chamber, with an injector attached to its injector end and a flared nozzle attached to its nozzle end. A liquid propellant including fuel and an oxidizer flows through injector ports in the injector and into the combustion chamber. The propellant is ignited in the combustion chamber. The hot gas resulting from the combustion expands through the nozzle and drives the rocket engine and the attached rocket structure in the direction opposite to that in which the nozzle is pointed.

The wall of the combustion chamber is exposed to high temperature combustion gas during service. The wall is preferably made of a refractory material such as rhenium coated with iridium on the inwardly facing surface. The injector plate is much cooler, and is typically made of titanium. When the rocket engine is fired, there is a large temperature increase from room temperature and a large temperature gradient between the upper end of the combustion chamber and the adjacent injector, through the region where the two are attached.

It is conventional practice to attach the injector plate to the combustion chamber with a flange-and-bolt system or by electron beam welding. The flange-and-bolt system has the disadvantage that the mechanical seal is not well suited to withstand, without leaking, the high temperatures, large temperature change between room temperature and the service temperature, and large temperature gradients during service. Welding of the extremely dissimilar metals is difficult. The high temperatures on the combustion chamber side of the joint and the high temperature gradient through the joint can lead to a premature failure of the joint and a shortening of the life of the engine. Even a small pinhole in the joint can be disastrous, as it results in a back leak of hot combustion gases from the interior of the combustion chamber.

Recent advances in the design of the rocket engine to allow higher-temperture combustion and the use of more powerful propellants have resulted in a even greater temperatures and temperature gradients. The existing attachment structures may be insufficient for operation in this environment. There is therefore a need for an improved approach to the attachment of the injector to the combustion chamber. The present invention fulfills this need, and further provides related advantages.

SUMMARY OF THE INVENTION

The present invention provides a rocket engine with an improved attachment between the injector and the combustion chamber. The rocket engine may be operated reliably at higher temperatures than possible with prior attachment procedures. The fabrication approach uses separately known techniques in a new way.

In accordance with the invention, a rocket engine comprises a combustion chamber comprising an annular wall, an injector, and an attachment between the combustion chamber and the injector. The attachment comprises an annular metallic deposit joined to a first region of the wall of the combustion chamber, an annular transition ring structure, a first weldment between a first welded portion of the transition ring structure and the metallic deposit, and a second weldment between a second welded portion of the transition ring structure and the injector. The first region of the wall of the combustion chamber, to which the metallic deposit is joined, is preferably an outer surface of the chamber wall.

The transition ring structure preferably, but not necessarily, includes an annular step collar, an annular adaptor ring, and a braze joint between at least a portion of the step collar and a portion of the adaptor ring. The step collar protects the end of the combustion chamber inner wall adjacent the injector from damage by the combustion gas and also improves the mixing of the propellants after injection. The step collar is brazed to the adaptor ring, which in turn is welded to the injector and to the metallic deposit.

The metallic deposit may be deposited by any operable technique. Preferably, it is deposited by chemical vapor deposition. The result is a good bond between the metallic deposit and the wall of the combustion chamber. Such a good bond is not easily attained for refractory metals such as the rhenium used in high-performance thrust chamber walls. In this case, the metallic deposit is preferably columbium. (As used herein, a metal identified generically includes both the pure metal and its alloys containing at least about 50 percent by weight of the pure metal. Thus, for example, in the Specification and in the Claims, "columbium" includes both pure columbium and its alloys.)

The injector is typically titanium (including both pure titanium and its alloys), and the adaptor ring is typically columbium (including both pure columbium and its alloys). The titanium/columbium weld between the injector and the adaptor ring, and the columbium/columbium weld between the adaptor ring and the metallic deposit, are both readily accomplished by electron beam welding.

The present approach therefore allows the fabrication of a rocket engine from difficult-to-join materials. The joints are sound and gas tight, both at low temperatures and at the elevated temperatures achieved during service. The integrity of the joints is not lost upon the rapid heating of the joint and under imposed high thermal gradients.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
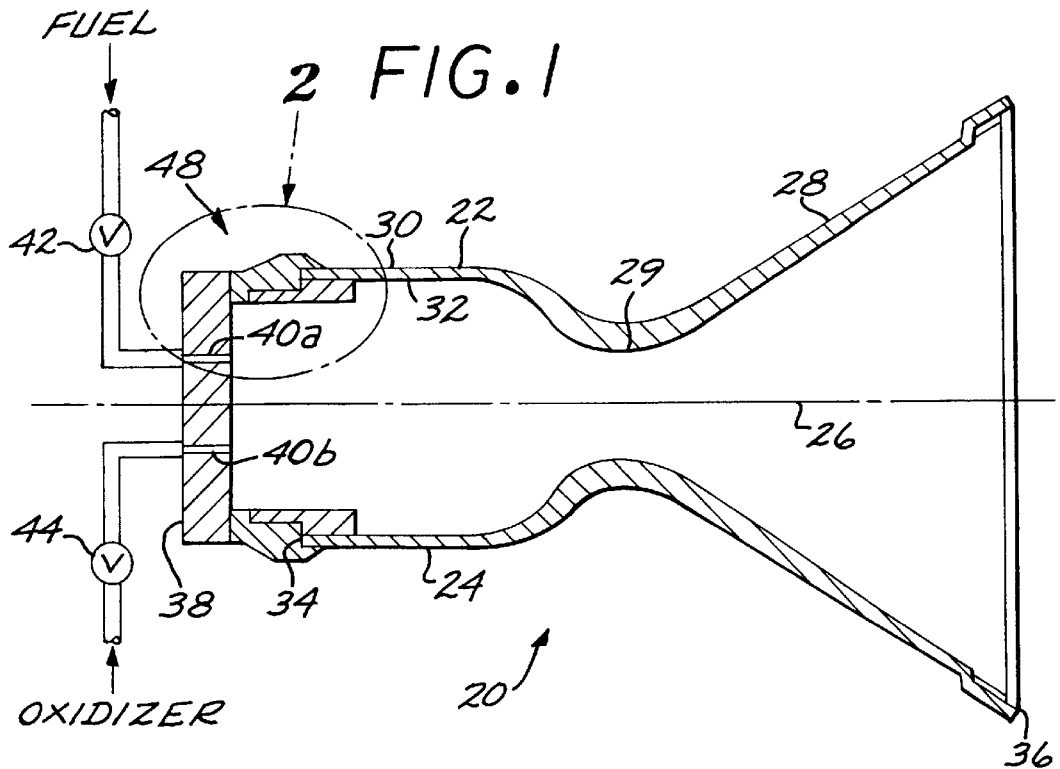
FIG. 1 is a sectional view of a rocket engine.
Figure 2:
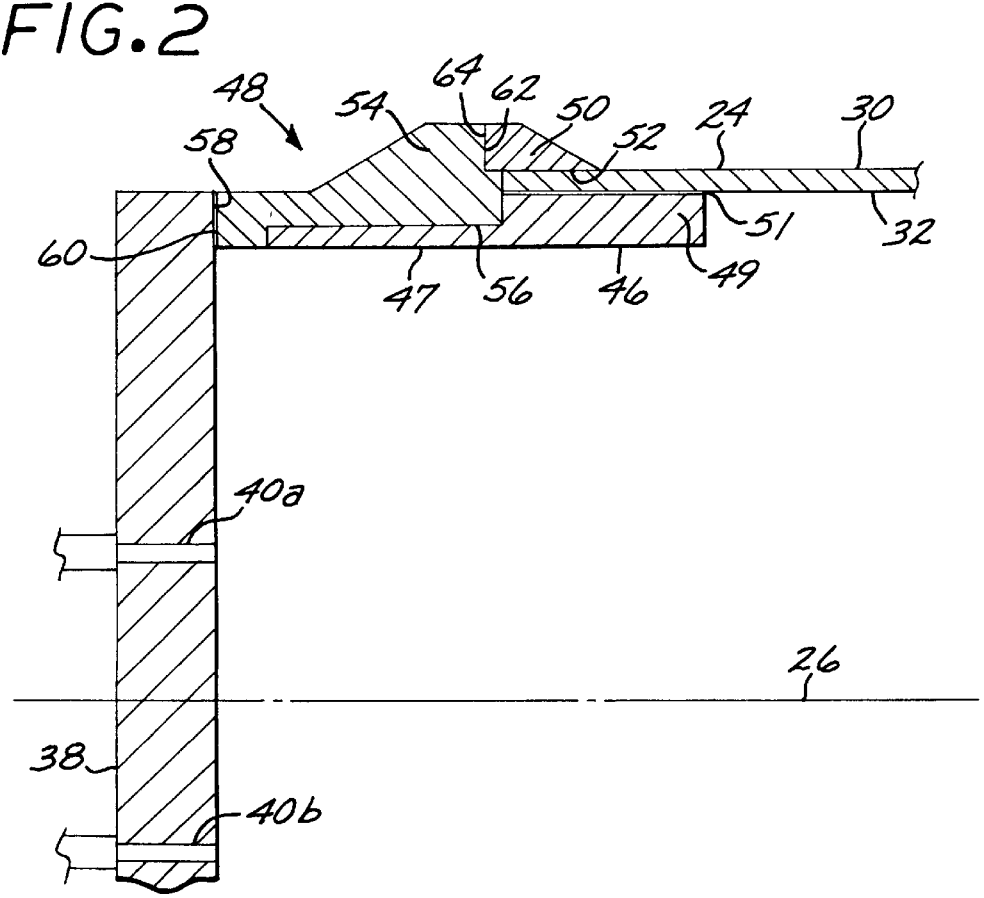
FIG. 2 is an enlarged detail of FIG. 1 in region 2—2, showing the injector, the injector end of the combustion chamber, and the attachment therebetween.

FIG. 1 depicts a rocket engine 20, and FIG. 2 shows a detail of the rocket engine. The rocket engine 20 includes a combustion chamber 22 having two major parts, a generally cylindrical annular wall 24 having a cylindrical axis 26, and an expansion nozzle 28. A narrowed throat 29 separates the cylindrical annular wall 24 from the expansion nozzle 28. In the illustrated rocket engine 20, the wall 24, the throat 29, and the nozzle 28 are fabricated separately and joined together, but they may instead be formed integrally. The cylindrical wall 24 has an outer cylindrical surface 30 and an inner cylindrical surface 32. The combustion chamber 22 has an injector end 34 and a nozzle end 36.

An injector 38 is attached to the injector end 34 of the combustion chamber 22. The injector 38 may be of any operable design, but is typically a plate having a plurality of injector ports 40 therein, of which only two are shown in FIGS. 1 and 2. The propellant is provided to the combustion chamber 22 through the injector ports 40. Some of injector ports 40a are supplied with a fuel through a fuel valve 42, and others of the injector ports 40b are supplied with an oxidizer through an oxidizer valve 44. The fuel and oxidizer flow through their respective injector ports 40 into the interior of the combustion chamber 22 and mix together. Where the mixture is hypergolic, as in the case of the preferred monomethylhydrazine (fuel) and nitrogen tetroxide/3 percent nitric oxide (oxidizer), the mixture ignites spontaneously. In other cases where the mixture does not spontaneously ignite, an ignitor (not shown) would be provided. The gaseous combustion products of the combustion expand rearwardly and outwardly through the nozzle 28 and drive the rocket engine 20, and the spacecraft to which it is attached, in the opposite direction.

To aid in the thorough mixing and combustion of the propellant fuel and oxidizer, a generally cylindrical annular step collar 46 is optionally but preferably fitted within the combustion chamber 22 at and adjacent to the injector end 34 thereof. The step collar 46 also protects the inner cylindrical surface 32 from contact with the hot combustion gas when the rocket engine is fired, along the upper end of the combustion chamber, closest to the injector 38, where the greatest corrosion and erosion damage from the combustion product is expected. The step in the step collar 46 encourages downstream turbulent mixing of the injected fuel and oxidizer to achieve maximum burning efficiency and specific impulse of the engine. When viewed in circumferential section as in FIG. 2, the step collar 46, which is preferably made of a single piece of material, has a generally "L" shape, with a long leg 47 of the "L" lying parallel to the cylindrical axis 26 and a short leg 49 of the "L" lying perpendicular to the cylindrical axis 26. The short leg 49 of the "L" extends further radially outwardly from the location where it meets the long leg 47. The step collar 46 is preferably not joined directly to the wall 24 because in such a structure the outward thermal expansion of the step collar 46 during service deforms the wall 24 and can lead to its failure. Instead, there is preferably a small gap 51 between the step collar 46 and the wall. The gap 51 is sufficiently large that, when the engine is operated and the step collar and wall heat and expand, the outer surface of the step collar does not contact the inner surface of the wall. The gap 51 is preferably no larger than required to prevent such contact, because a larger gap would allow hot combustion gas to flow into the gap by a backdraft effect.

An attachment 48 joins the combustion chamber 22, the step collar 46, and the injector 38. The attachment 48 includes several elements and several joints. The attachment 48 must mechanically join the combustion chamber 22, the step collar 46, and the injector 38 to bear the loads imposed during handling and service, during the large temperature changes and gradients which are experienced during service, and also provide a seal against the leakage of hot gas at the injector end 34 of the combustion chamber 22.

The attachment 48 includes an annular metallic deposit 50 joined in a metal-to-metal contact to a first region 52 of the wall 24 of the combustion chamber 22. The first region 52 is preferably on the outer cylindrical surface 30 of the wall 24, at the injector end 34. The metallic deposit 50 is preferably about 0.110 thick (in the radial direction perpendicular to the cylindrical axis 26) at its thickest location and tapers toward the wall 24 with increasing distance from the injector 38. The thick region is about 0.1 inches long in the direction parallel to the cylindrical axis 26, and the tapered region extends about another 0.1 inch, for a total length of the deposit 50 of about 0.2 inch.

The attachment 48 further includes an annular adaptor ring 54 joined to the step collar 46 (if present), preferably by a joint 56, which is most preferably a brazed joint.

The adaptor ring 54 is joined by a joint 58 at an injector end 60 to the injector 38, and is joined by a joint 62 at a chamber end 64 to the annular metallic deposit 50. The joints 58 and 62 are preferably both welded joints. This structure is not altered in the absence of the step collar 46.

In a preferred embodiment, the wall 24 of the combustion chamber 22 is made of rhenium with a 0.003–0.005 inch thick coating of iridium on the inner cylindrical surface 32. (As used herein, a metal identified generically includes both the pure metal and its alloys containing at least about 50 percent by weight of the pure metal. Thus, for example, "rhenium" includes both pure rhenium and its alloys.) The metallic deposit is preferably made of relatively pure columbium or C103 alloy having a composition of 10 weight percent hafnium, 1 weight percent titanium, balance columbium. The step collar 46 is preferably made of a material having a high melting point and good corrosion/erosion resistance in the combustion environment of the combustion chamber 22, such as an alloy of platinum and rhodium, an alloy of columbium, or a ceramic. The preferred alloy of platinum and rhodium is 90 percent by weight platinum, balance rhodium. The preferred alloy of columbium is 10 percent by weight hafnium, 1 percent by weight titanium, balance columbium. The preferred ceramic is aluminum oxide, thorium oxide, or yttria-stabilized zirconium oxide. The adaptor ring 54 is preferably made of columbium, most preferably C103 alloy having a composition of 10 weight percent hafnium, 1 weight percent titanium, balance columbium. The injector 38 is preferably made of titanium, most preferably an alloy of 6 weight percent aluminum, 4 weight percent vanadium, balance titanium. The joint 56 is brazed, preferably with a braze alloy of 60 weight percent palladium, 40 weight percent nickel. This braze alloy is compatible with corrosive combustion gas products, does not substantially diffuse into the structure on either side of the joint, and does not leak propellant gas. The joints 58 and 62 are preferably electron beam welds.

The metallic deposit 50 is present to join the adaptor ring 54 to the wall 24 of the combustion chamber 22. The columbium adaptor ring 54 does not readily braze or weld directly to the relatively thin rhenium wall 24 of the combustion chamber 22 with the required strength and soundness. The metallic deposit 50 is first deposited onto the wall 24, and then the adaptor ring 54 is welded to the deposit 50.

Figure 3:
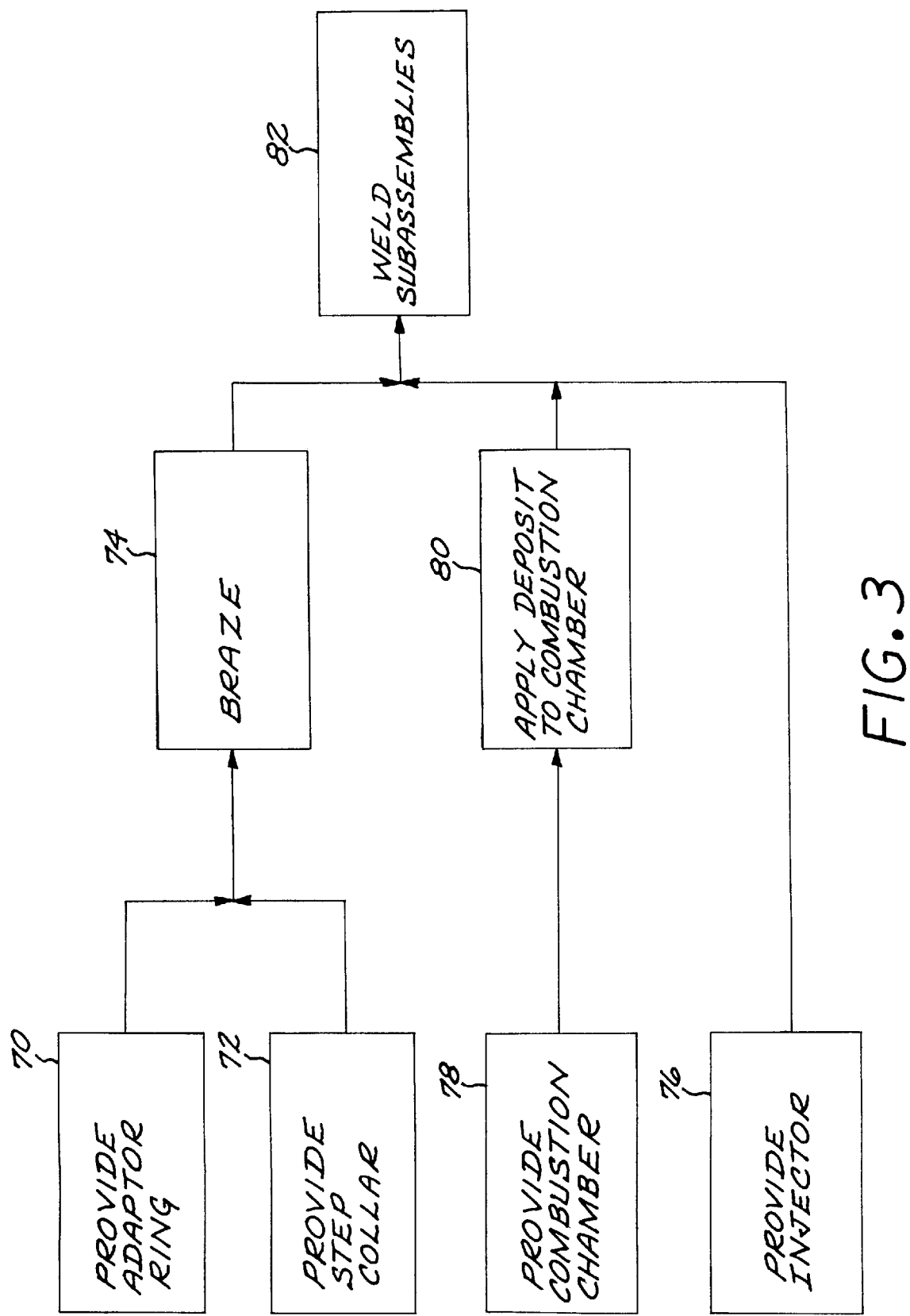
FIG. 3 is a block flow diagram of a method for fabricating the rocket engine.

FIG. 3 illustrates the preferred approach to the fabrication of the rocket engine 20. The adaptor ring 54 is provided, numeral 70, and the step collar 46 is provided, numeral 72. The adaptor ring 54 and the step collar 46 are brazed together, numeral 74. In brazing, a shim of the braze alloy, preferably 60 weight percent palladium, 40 weight percent nickel, is placed between the adaptor ring 54 and the step collar 46, and additional braze alloy is provided if necessary as a wire at the end of the joint 56. The assembly is heated in vacuum to a brazing temperature where the braze alloy melts, above about 1238° C. in the case of the preferred braze alloy, and then cooled to room temperature.

The injector 38 is provided, numeral 76. The combustion chamber 22 is provided, numeral 78. The metallic deposit 50 is deposited in the region 52 by any operable method, preferably on the outer surface 30, numeral 80. The preferred columbium deposit 50 is deposited onto the outer surface of the wall 24 of the combustion chamber 22 by inertial welding of a deposit, explosive cladding of a deposit, chemical vapor deposition, or plasma spray into the masked-off region 52. The result is an excellent metallurgical bond between the wall 24 and the metallic deposit 50.

The brazed assembly of the adaptor ring 54 and the step collar 46 is welded at its injector end 60 to the injector 38, and welded at its chamber end 64 to the metallic deposit 50, numeral 82. Any operable welding technique may be used. Preferably, both welds are electron beam welds. The two welds may be made in any order. In the preferred combination of materials, the columbium adaptor ring 54 readily welds both to the columbium deposit 50 and to the titanium injector 38.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A rocket engine, comprising
   a combustion chamber comprising an annular wall with a chamber wall outer surface and a combustion chamber axis;
   an injector; and
   an attachment between the combustion chamber and the injector, the attachment comprising:
     an annular metallic deposit joined to a first region of the wall of the combustion chamber,
     an annular transition ring structure, wherein the transition ring structure comprises:
       an annular step collar,
       an annular adaptor ring, and
       a braze joint between at least a portion of the step collar and a portion of the adaptor ring,
     a first joint between the adaptor ring and the metallic deposit, and
     a second joint between the adaptor ring and the injector.

2. The rocket engine of claim 1, wherein the first region of the wall of the combustion chamber is a portion of the chamber wall outer surface.

3. The rocket engine of claim 1, wherein the second joint lies substantially perpendicular to the combustion chamber axis.

4. The rocket engine of claim 1, wherein the step collar is made of platinum.

5. The rocket engine of claim 1, wherein
   the wall of the combustion chamber is made of rhenium,
   the metallic deposit is made of columbium,
   the first joint portion of the transition ring structure is made of columbium,
   the second joint portion of the transition ring structure is made of columbium, and
   the injector is made of titanium.

6. The rocket engine of claim 1, wherein the first joint and the second joint are each weldments.

7. A rocket engine, comprising
   a combustion chamber comprising a generally cylindrical annular wall with a chamber wall outer surface, a chamber wall inner surface, and a cylindrical axis;
   an injector; and
   an attachment between the combustion chamber and the injector, the attachment comprising:
     an annular metallic deposit joined to the chamber wall outer surface,
     an annular transition ring structure including
       an annular step collar,
       an annular adaptor ring, and
       a braze joint between at least a portion of the step collar and a portion of the adaptor ring,
     a first weldment between a first welded portion of the adaptor ring structure and the metallic deposit, and
     a second weldment between a second welded portion of the adaptor ring structure and the injector.

8. The rocket engine of claim 7, wherein
   the wall of the combustion chamber is made of rhenium,
   the metallic deposit is made of columbium,
   the first welded portion of the transition ring structure is made of columbium,
   the second welded portion of the transition ring structure is made of columbium, and
   the injector is made of titanium.

9. A method for fabricating a rocket engine, comprising the steps of
   providing a combustion chamber comprising an annular wall with a chamber wall outer surface and a combustion chamber axis;
   depositing an annular metallic deposit on a first region of the wall of the combustion chamber;
   providing an attachment between the combustion chamber and the injector, the attachment comprising an annular transition ring structure comprising an annular adaptor ring and an annular step collar;
   welding the attachment to the metallic deposit;
   providing an injector; and
   welding the injector to the attachment.

10. The method of claim 9, wherein the step of depositing includes the step of
    depositing the annular metallic deposit by a technique selected from the group consisting of inertial welding, explosive cladding, chemical vapor deposition, and plasma spraying.

11. The method of claim 9, wherein the step of depositing includes the step of
    depositing the metallic deposit onto the chamber wall outer surface.

12. The method of claim 9, wherein the step of welding the attachment to the metallic deposit includes the step of
    forming a weld joint lying substantially perpendicular to the combustion chamber axis.

13. The method of claim 9, wherein the step of providing an attachment includes the steps of
    providing an annular step collar,
    providing an annular adaptor ring, and
    brazing together at least a portion of the step collar and a portion of the adaptor ring.

14. The method of claim 9, wherein
the wall of the combustion chamber is made of rhenium,
the metallic deposit is made of columbium,
the first welded portion of the transition ring structure is columbium,
the second welded portion of the transition ring structure is columbium, and
the injector is titanium.

\* \* \* \* \*